(12) United States Patent
Koyama et al.

(10) Patent No.: US 6,867,916 B2
(45) Date of Patent: Mar. 15, 2005

(54) VIEWFINDER OPTICAL SYSTEM

(75) Inventors: Takeshi Koyama, Kanagawa-ken (JP); Yasunori Murata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/581,333

(22) Filed: Dec. 29, 1995

(65) Prior Publication Data

US 2001/0048552 A1 Dec. 6, 2001

(30) Foreign Application Priority Data

| Jan. 11, 1995 | (JP) | ............................................. 7-018637 |
| Apr. 11, 1995 | (JP) | ............................................. 7-110048 |
| Nov. 30, 1995 | (JP) | ............................................. 7-336070 |

(51) Int. Cl.$^7$ ............................. G02B 23/00; G02B 5/04
(52) U.S. Cl. ...................... 359/431; 359/362; 359/831
(58) Field of Search ................................ 359/362–366, 359/420–433, 676–690, 831–837, 554–557, 663, 720, 727–733; 396/373–386; 354/219–225

(56) References Cited

U.S. PATENT DOCUMENTS

| 2,780,142 A | | 2/1957 | Bouwers ...................... 359/831 |
| 3,152,214 A | * | 10/1964 | Korones et al. ............. 359/422 |
| 4,063,261 A | | 12/1977 | Kuboshima .................. 354/225 |
| 4,477,156 A | * | 10/1984 | Gebelein et al. ............. 359/364 |
| 4,812,864 A | | 3/1989 | Baker ........................... 354/224 |
| 4,941,012 A | | 7/1990 | Inabata ........................ 396/271 |
| 5,034,764 A | | 7/1991 | Inabata ........................ 396/383 |
| 5,126,549 A | * | 6/1992 | Yamada ....................... 359/407 |
| 5,153,772 A | * | 10/1992 | Kathman et al. ............ 359/365 |
| 5,231,534 A | * | 7/1993 | Kato ............................ 359/432 |
| 5,436,765 A | | 7/1995 | Togino ......................... 359/631 |
| 5,528,279 A | | 6/1996 | Suzuki et al. ................ 347/260 |
| 5,587,836 A | | 12/1996 | Takahashi et al. ........... 359/630 |
| 5,594,588 A | | 1/1997 | Togino ......................... 359/631 |
| 5,640,632 A | | 6/1997 | Koyama et al. ............. 396/382 |
| 5,652,679 A | * | 7/1997 | Freeman ..................... 359/731 |
| 5,661,604 A | | 8/1997 | Kuba ........................... 359/637 |
| 5,701,202 A | * | 12/1997 | Takahashi .................... 359/631 |
| 6,532,116 B1 | | 3/2003 | Yamazaki .................... 359/728 |
| 2001/0009478 A1 | | 2/2001 | Yamazaki et al. ........... 359/630 |

FOREIGN PATENT DOCUMENTS

| FR | 966484 | 10/1950 | |
| JP | 58-62337 | 4/1983 | |
| JP | 63-264701 | * 11/1988 | ................. 359/431 |
| JP | 1-209432 | 8/1989 | |
| JP | 1160427 | 11/1989 | |
| JP | 2-234139 | 9/1990 | |
| JP | 4-86733 | 3/1992 | |
| JP | 5-303056 | 11/1993 | |
| JP | 6-43389 | 2/1994 | |
| JP | 6167739 | 6/1994 | |
| JP | 6-324285 | 11/1994 | |

* cited by examiner

Primary Examiner—Thong Q Nguyen
(74) Attorney, Agent, or Firm—Fitzpatrick, Cella, Harper & Scinto

(57) ABSTRACT

A compact magnification-varying viewfinder optical system includes an objective lens unit for forming a primary image, the objective lens unit having at least one curved reflection surface arranged to reflect a light flux and a lens surface, and an eyepiece lens unit for observing the primary image, wherein an optical power is imparted to the curved reflection surface.

13 Claims, 5 Drawing Sheets

VIEWFINDER OPTICAL SYSTEM

BACKGROUND OF THE INVENTION

1. Field of the Invention

This invention relates to a viewfinder optical system and more particularly to an optical system for a viewfinder arranged to make an inverted real viewfinder image (object image) formed by an objective lens adequately viewable as a non-inverted erecting image by using an image inverting means, which is appositely set in such a way as to permit reduction in size of the whole optical system.

2. Description of the Related Art

Real-image type viewfinder optical systems have been variously developed to permit a real viewfinder image formed on a primary image forming plane within a viewfinder system of a photographing camera, video camera or the like, to be viewable through an eyepiece. The real-image type viewfinder optical systems permit reduction in size of the whole optical system more easily than virtual-image type viewfinder optical systems. The real-image type viewfinder optical systems, therefore, have been often employed in cameras having zoom lenses.

A real-image type viewfinder optical system disclosed, for example, in Japanese Laid-Open Utility Model Application No. SHO 58-62337 is arranged to convert, by using an image inverting means such as a Porro prism, an object image (viewfinder image) formed by an objective lens on a primary image forming plane into a non-inverted erecting viewfinder image and to make the non-inverted erecting viewfinder image viewable through an eyepiece. Further, Japanese Laid-Open Utility Model Application No. HEI 1-160427 discloses another real-image type viewfinder optical system arranged to invert a viewfinder image by means of a roof-shaped reflection member and two mirrors which are disposed within an optical path.

Furthermore, to meet a demand for reduction in size and thickness of a camera as a whole, Japanese Laid-Open Patent Application No. HEI 6-167739 discloses a viewfinder optical system arranged to shorten its whole lens length by bending at a reflection surface an optical path leading to a primary image forming plane where an object image is to be formed by an objective lens and by forming the primary image forming plane within an image inverting means.

In the conventional real-image type viewfinder optical system of the kind using a Porro prism or the like as an image inverting means for obtaining a non-inverted erecting image, the optical action or an objective lens which forms an object image on a primary image forming plane and that of the image inverting means are clearly divided from each other. The image inverting means, for example, is arranged to exert no refracting power when the object image is formed on the primary image forming plane. Therefore, in a case where a viewfinder optical system has a part of the image inverting means (such as a prism member) between the objective lens and the primary image forming plane, the objective lens is arranged to be of a retro-focus type to make its back focal distance longer. This arrangement necessitates to increase the amount of retro-focusing according to the length of the back focal distance. This requirement has caused the size of the objective lens to be apt to become larger.

In a case where the viewfinder optical system is arranged to have a part of the image inverting means between the objective lens and the primary image forming plane and to have a total reflection surface arranged on the object side of the primary image forming plane to bend an optical path, in order to have a whole light flux efficiently total-reflected by the total reflection surface, the objective lens must be formed by an exit-side telecentric system. That requirement also has caused the size of the objective lens to become larger.

SUMMARY OF THE INVENTION

It is an object of this invention to provide a real-image type viewfinder optical system which is arranged to have the refracting power of an objective lens and the structure of image inverting means appositely set in such a way as to permit reduction in size of the viewfinder optical system as well as to make a viewfinder image adequately viewable as a non-inverted erecting image through the image inverting means, in observing an object image formed by the objective lens on a primary image forming plane.

To attain this object, a compact magnification-varying viewfinder optical system arranged according to this invention comprises an objective lens unit for forming a primary image, the objective lens unit having at least one curved reflection surface arranged to reflect a light flux and a lens surface, and an eyepiece lens unit for observing the primary image, wherein an optical power is imparted to the curved reflection surface.

The above and other objects and features of this invention will become apparent from the following detailed description of embodiments thereof taken in connection with the accompanying drawings.

DETAILED DESCRIPTION OF THE PREFERRED EMBODIMENTS

Figure 1:
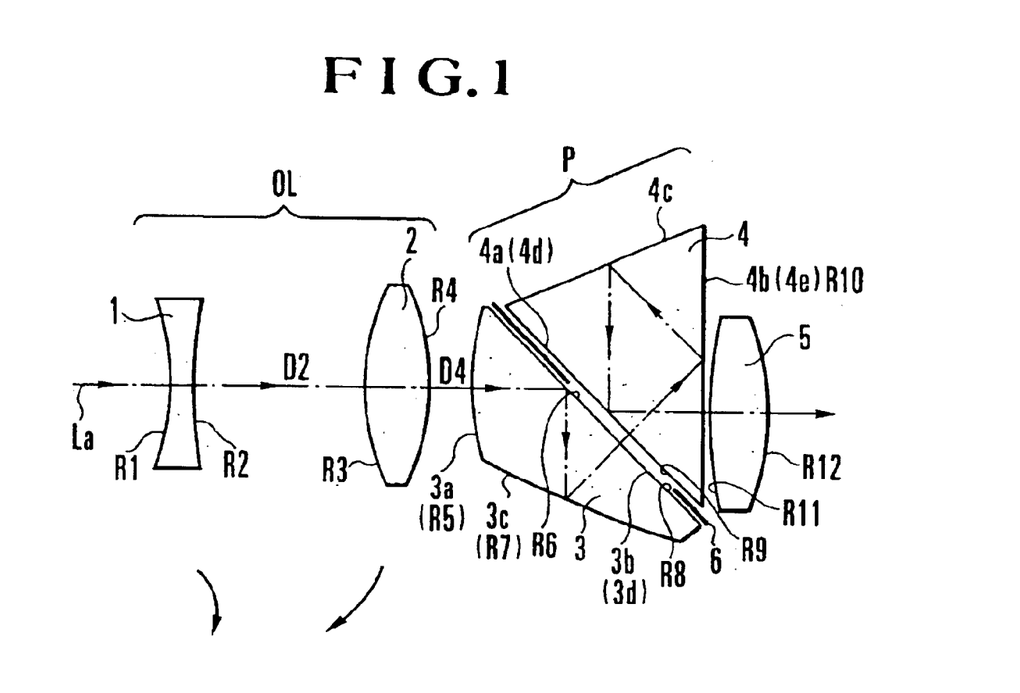
FIG. 1 is a sectional view showing the lenses of a viewfinder optical system arranged according to this invention as a first embodiment thereof.
Figure 2:
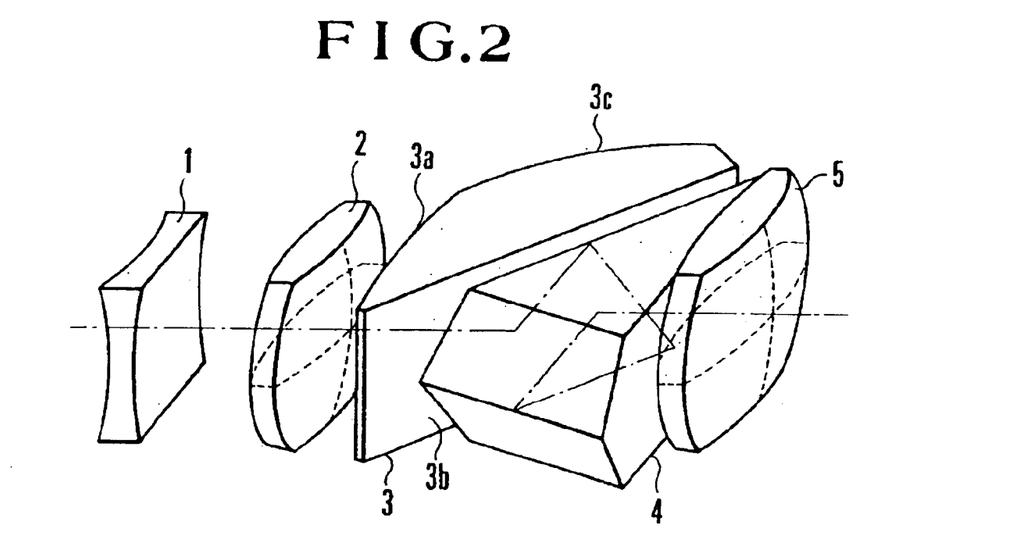
FIG. 2 is an oblique view showing the viewfinder optical system shown in FIG. 1.

FIG. 1 is a sectional view showing the essential parts of a viewfinder optical system which is a first embodiment of this invention. FIG. 2 is an oblique view showing the essential parts of the first embodiment.

Referring to FIGS. 1 and 2, an objective lens OL is composed of two lenses which are movable along an optical axis, i.e., a negative lens 1 and a positive lens 2. Image inverting means P for obtaining a non-inverted erecting image includes a first prism 3 (a first reflection member) and a second prism 4 (a second reflection member). A field frame 6 is arranged to restrict a viewfinder field and is disposed within a narrow space across which an exit surface 3d of the first prism 3 and an entrance surface 4a of the second prism 4 are opposed to each other. Further, the field frame 6 corresponds to the position of a primary image forming plane on which an object image is to be formed by the objective lens OL.

A viewfinder image is formed in a state of an inverted real image by the objective lens OL through the first prism 3 on the primary image forming plane located in the neighborhood of the field frame 6. An objective lens system is thus formed jointly by the objective lens OL and the first prism 3. An eyepiece lens 5 is arranged to cause the viewfinder image formed in the neighborhood of the field frame 6 as an inverted real image to become viewable through the second prism 4 in a state of a non-inverted erecting image.

In the first embodiment, as a photo-taking lens (not shown) performs a magnification varying action, the magnification of the viewfinder optical system is varied by moving the negative lens 1 and the positive lens 2 along the optical axis independently of each other as indicated by arrow marks. This arrangement renders the viewfinder image viewable as in a state of varying according to any change taking place in the magnifying power of the phototaking lens when the magnification varying action is performed.

Features of the two prisms 3 and 4 which constitute the image inverting means P in the first embodiment are next described.

The first prism 3 is arranged to make a light flux from the objective lens OL incident on an entrance surface 3a. The entrance surface 3a is a curved surface having a positive refractive convex toward the objective lens OL. In this instance, the objective lens OL and the entrance surface 3a cause the optical system to become approximately exit telecentric. The whole light flux incident on the entrance surface 3a is then totally reflected by a negative-power surface 3b of the first prism 3 toward a surface 3c (in a direction perpendicular to an optical axis La).

The surface 3b is composed of a reflection surface convex toward the object side and is slanting about 45 degrees with respect to the optical axis La. The surface 3c is composed of a positive-power reflection surface concave toward the entrance side and is slanting about 22.5 degrees with respect to the optical axis La. In other words, with the incident angle of a light ray coming along the optical axis assumed to be $\theta$, the incident angle is arranged to be $\theta \approx 22.5°$.

In general, reflection by a curved surface is such that the smaller the incident angle $\theta$, the better the symmetry of aberration. In the case of a perpendicular incidence, lateral symmetry becomes perfect. In that case, however, the light flux comes back toward the a entrance side after the light flux is reflected. In view of this, the first embodiment is arranged to have the incident angle $\theta$ set at $21° \leq \theta \leq 24°$.

A reflection film is applied by vapor evaporation to the reflection surface 3c. The surface 3c is arranged to reflect the light flux coming from the surface 3b toward the surface 3d (R8), which is on the same plane as the surface 3b, to allow the reflected light flux to exit from the surface 3d to the outside. The surface 3d (R8) is arranged to be eccentric with respect to the light flux exiting from the first prism 3.

The surface 3b (R6) which acts as a reflection surface has a moderate curvature as the incident angle of a light ray coming along the optical axis La is 45 degrees. The surface 3c (R7) thus has a stronger curvature than the surface 3b. The surface 3c, which has a positive power, is located near to the primary image forming plane to give, in effect, a substantially short back focal distance.

The second prism 4 is arranged to make a light flux from the surface 3d of the first prism 3 incident on an entrance surface 4a which is slanting 45 degrees with respect to the optical axis La. The incident light flux from the surface 4a is totally reflected by a surface 4b which is located nearly perpendicular to the optical axis La of the objective lens OL. The totally reflected light flux from the surface 4b is thus made incident on a surface 4c which is composed of a roof-shaped surface. The surface 4c is arranged to reflect and direct the light flux from the surface 4b to a surface 4d which is on the same plane as the surface 4a. In this instance, the surface 4c causes the light flux on the optical axis La reflected toward the surface 4d to come at such an incident angle that the light flux is totally reflected by the surface 4d in a direction parallel to the optical axis La. The surface 4c, which is a roof-shaped surface, is bent in the direction of the shorter side of the viewing field (the visual field) of the viewfinder, i.e., in the so-called vertical direction of the camera. The light flux totally reflected by the surface 4d is caused to fall perpendicularly on an exit surface 4e which is on the same plane as the surface 4b, and is, then, allowed to exit to the outside from the surface 4e.

In the first embodiment, a viewfinder image is formed with the light flux in a position near to the exit surface 3d of the first prism 3, i.e., near to the field frame 6, after the light flux has been subjected to the refracting action of the objective lens OL and the refracting and reflecting actions of the surfaces 3a, 3b, 3c and 3d of the first prism 3.

In other words, in the first embodiment, the first prism 3 is arranged to participate in the image forming action of the objective lens OL. The viewfinder image is formed in an inverted state in the neighborhood of the field frame 6. The eyepiece lens 5 is arranged to make this inverted viewfinder image viewable as a non-inverted erecting real image through the second prism 4.

As described above, in the first embodiment, the first prism 3 is arranged to perform both an optical action as an objective lens and an optical action as an image inverting means. It is a particularly advantageous feature of the first prism 3 to have each surface of the first prism 3 arranged to have a refracting power, so that latitude of arrangement for aberration correction can be increased. Further, with a refracting power arranged to exist also in the neighborhood of the primary image forming plane, the back focal distance can be substantially shortened. This arrangement permits reduction in size of the whole lens system by lessening the degree of retro-focus of the objective lens OL.

Incidentally, the first prism 3 and the second prism 4 in the first embodiment may be replaced with a plurality of mirror surfaces.

A numerical example 1 of the first embodiment shown in FIG. 1 is next described as follows. In the case of the numerical example 1, the first and second prisms are shown as in a state obtained when an optical path is developed.

In the numerical example 1, Ri represents the radius of curvature of the i-th lens surface when counted from the object side, Di represents the i-th lens thickness or air separation when counted from the object side, and Ni and vi respectively represent the refractive index and Abbe number of the glass of the i-th lens element when counted from the object side.

As shown in FIG. 1, the surfaces R6 and R8 are on one and the same plane. Surfaces R9 and R10 respectively correspond to the entrance surface 4a and the exit surface 4e of the second prism 4. The roof surface 4c and the surface 4d of the second prism 4 are omitted as reflection surfaces.

Assuming that an axis X is in the direction of the optical axis, an axis H is perpendicular to the optical axis, the progressing direction of light is positive and that a paraxial radius of curvature is expressed as R and aspherical coefficients are expressed as A, B, C and D, respectively, an aspherical shape can be expressed by the following formula:

$$X = \frac{(1/R)H^2}{1+\sqrt{1-(1+K)(H/R)^2}} + AH^4 + BH^6 + CH^8 + DH^{10}$$

NUMERICAL EXAMPLE 1

$2\omega = 28° \sim 51°$

| | | | |
|---|---|---|---|
| R1 = −15.612 | D1 = 1.29 | N1 = 1.583 | ν1 = 30.2 |
| R2 = 29.675 | D2 = variable | | |
| R3 = 11.158 | D3 = 3.09 | N2 = 1.492 | ν2 = 57.4 |
| R4 = aspherical | D4 = variable | | |
| R5 = 15.000 | D5 = 4.60 | N3 = 1.571 | ν3 = 33.8 |
| R6 = 500 | D6 = 5.60 | N4 = 1.571 | ν4 = 33.8 |
| R7 = −70 | D7 = 3.96 | N5 = 1.571 | ν5 = 33.8 |
| R8 = 500 | D8 = 0.63 | | |
| R9 = ∞ | D9 = 24.00 | N6 = 1.571 | ν6 = 33.8 |
| R10 = ∞ | D10 = 0.2 | | |
| R11 = aspherical | D11 = 3.2 | N7 = 1.492 | ν7 = 57.4 |
| R12 = −13.087 | | | |

| | Wide-angle | Middle | Telephoto |
|---|---|---|---|
| D2 | 8.15 | 3.96 | 1.56 |
| D4 | 2.30 | 5.62 | 8.94 |

Figure 3:
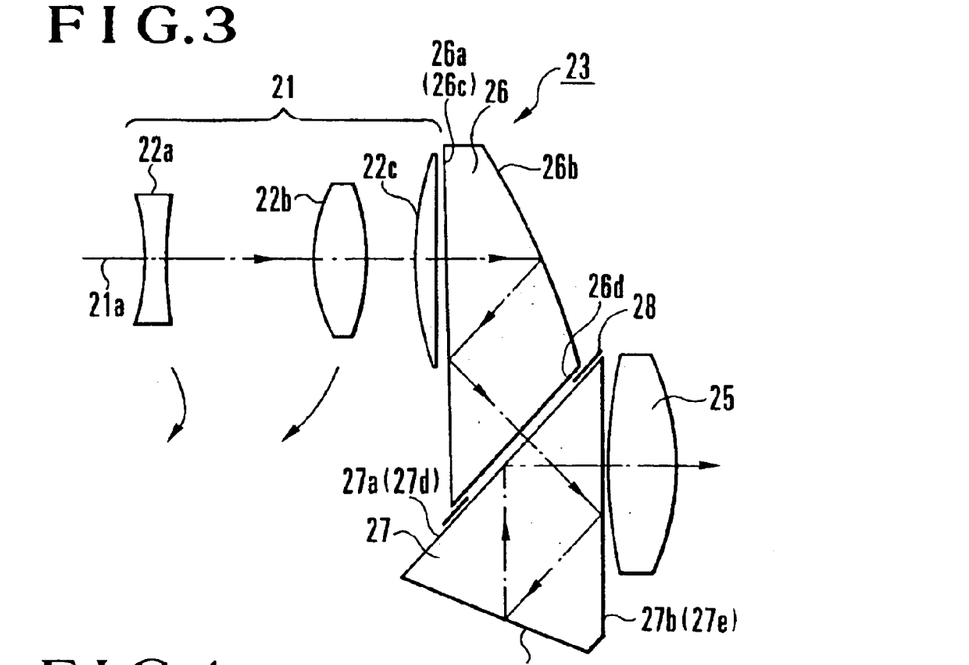
FIG. 3 is a sectional view showing the lenses of a viewfinder optical system arranged according to this invention as a second embodiment thereof.

Aspherical shape
surface R4   R = −10.756   A = 0   B = 4.1086 × $10^{-4}$
             C = −7.398 × $10^{-6}$   D = 5.9747 × $10^{-7}$
surface R11  R = 21.824   A = 0   B = −1.4067 × $10^{-4}$
             C = 1.1727 × $10^{-6}$   D = −1.6959 × $10^{-8}$ FIG. 3 is a sectional view showing essential parts of a second embodiment of this invention.

Referring to FIG. 3, an objective lens 21 is composed of three lenses, i.e., negative and positive lenses 22a and 22b which are movable along an optical axis and a fixed positive lens 22c. Image inverting means 23 is provided for obtaining a non-inverted erecting image. The image inverting means 23 is composed of a first prism 26 (a first reflection member) and a second prism 27 (a second reflection member). A field frame 28 which is arranged to restrict a viewfinder visual field is disposed in a narrow space across which an exit surface 26d of the first prism 26 and an entrance surface 27a of the second prism 27 are opposed to each other.

The objective lens 21 is arranged to form a viewfinder image as an inverted real image through the first prism 26 in the neighborhood of the field frame 28. An eyepiece lens 25 is arranged to cause the viewfinder image which is formed near the field frame 28 as an inverted real image to become viewable as a non-inverted erecting viewfinder image through the second prism 27.

In the case of the second embodiment, as a magnification-varying operation of a photo-taking lens (not shown) is performed, a magnification-varying operation of the viewfinder optical system is carried out by causing the negative and positive lenses 22a and 22b which constitute the objective lens 21 to move along the optical axis independently of each other as indicated arrow marks. This arrangement renders the viewfinder image viewable as in a state of varying according to any change taking place in the magnifying power of the photo-taking lens when the magnification varying action is performed.

The two prisms 26 and 27 which constitute the image inverting means 23 in the second embodiment are described as follows. The first prism 26 is arranged to make a light flux from the objective lens 21 incident on an entrance surface 26a which is perpendicular to an optical axis 21a. Then, a positive-power surface 26b concave toward the entrance side reflects the light flux coming from the entrance surface 26a toward a surface 26c which is on one and the same plane as the entrance surface 26a. The surface 26b is slanting 22.5 degrees with respect to the optical axis 21a and has a reflection film applied thereto by vapor evaporation. In this instance, the objective lens 21 and the surface 26b are arranged to form an exit telecentric system.

The next reflection surface 26c is arranged to enable the light flux to be efficiently totally reflected over the whole angle of view. Incidentally, the surface 26b may be a spherical surface, an aspherical surface, a toric surface or the like.

Further, the slanting angle θ of the surface 26b with respect to the optical axis 21a is arranged, like in the case of the first embodiment, to be 21°≦θ≦24°. The light flux from the surface 26b is totally reflected by the surface 26c to be made perpendicularly incident on the exit surface 26d before the light flux exits to the outside from the surface 26d.

The shape of the second prism 27 and the optical action of the eyepiece lens 25 are the same as those of the first embodiment.

Specifically, the second prism 27 is arranged to make the light flux from the surface 26d of the first prism 26 incident on an entrance surface 27a. The surfaces 26d and 27a are disposed approximately in parallel to each other. The incident light flux from the surface 27a is totally reflected by a surface 27b which is disposed nearly perpendicular to the optical axis 21a of the objective lens 21. The totally reflected light flux is then reflected by a surface 27c which is a roof surface and is thus conducted to a surface 27d which is on the same plane as the surface 27a. In this instance, the angle of incidence on the surface 27c is arranged to be such that the light flux incident on the surface 27d is totally reflected by the surface 27d in a direction parallel to the optical axis 21a.

The surface 27c which is a roof surface is bent in the direction of the shorter side of the viewing field (the visual field) of the viewfinder, i.e., in the so-called vertical direction of the camera. The light flux totally reflected by the surface 27d is caused to fall perpendicularly on an exit surface 27e which is on the same plane as the surface 27b before the light flux is allowed to exit to the outside from the surface 27e.

A viewfinder image (an object image) is formed jointly by the refracting action of the objective lens 21 and that of the surface 26b of the first prism 26 in the neighborhood of the exit surface 26d of the first prism 26, i.e., near to the field frame 28. The viewfinder image which is formed in the state of an inverted real image near to the field frame 28 is caused to become viewable by converting the viewfinder image into a non-inverted real viewfinder image by the eyepiece lens 25 through the second prism 27.

In the second embodiment, like in the case of the first embodiment, the first prism 26 is arranged to perform both an optical action as an objective lens and another optical action as an image inverting means.

A third embodiment of this invention is next described. The third embodiment differs from the first embodiment in the following points. Unlike the first embodiment, the entrance surface 3a of the first prism 3 is arranged to be planar and the positive refractive power which is imparted to the entrance surface 3a in the case of the first embodiment is divided to the objective lens OL and/or to the concave reflection surface 3c, and the optical system is arranged to be made approximately exit telecentric through the objective lens OL alone. With the exception of these points, the third embodiment is arranged to be exactly the same as the first embodiment described in the foregoing. The third embodiment has the first prism thus arranged simpler than in the first embodiment and yet has about the same advantageous effect as the first embodiment.

Figure 4:
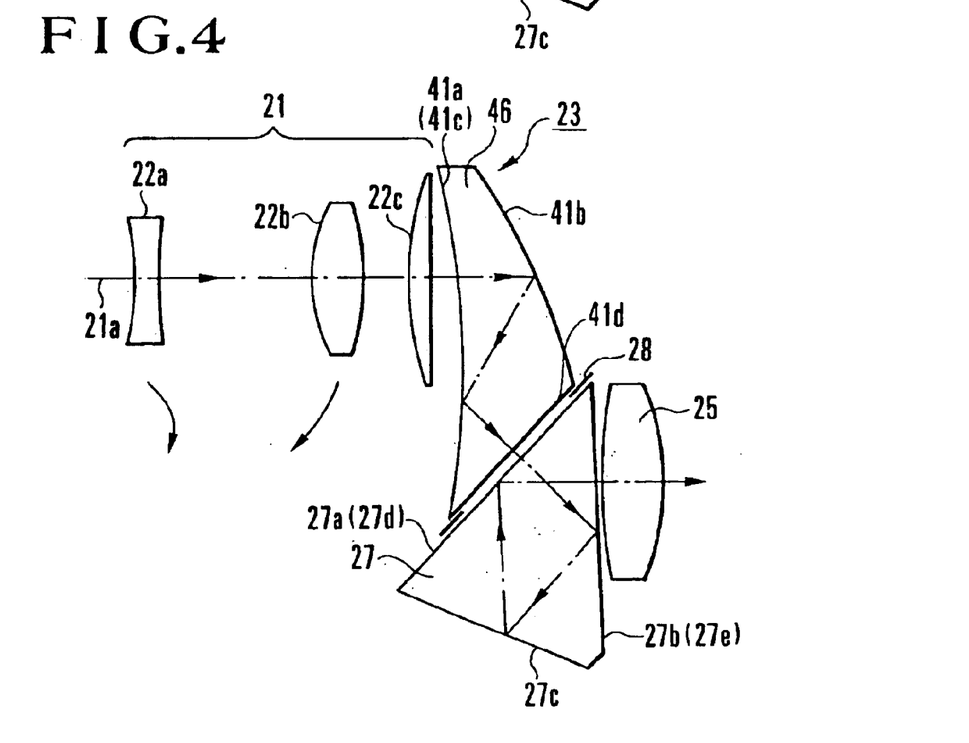
FIG. 4 is a sectional view showing the lenses of a viewfinder optical system arranged according to this invention as a fourth embodiment thereof.

FIG. 4 shows, in a sectional view, essential parts of a fourth embodiment of this invention. The fourth embodiment differs from the second embodiment shown in FIG. 3 in the following points. Referring to FIG. 4, in the fourth embodiment, a first prism 46 has a surface on the entrance side arranged to be a refracting surface 41a of a negative refractive power (having a shape concave toward the objective lens 21), instead of a planar shape. A light flux from a reflection surface 41b which is in a concave shape (corresponding to the surface 26b of FIG. 3) is arranged to be totally reflected by a convex reflection surface 41c which is a part of the refracting surface 41a. The objective lens 21, the refracting surface 41a and the concave reflection surface 41b are arranged to give an exit telecentric system. With the exception of these points, the fourth embodiment is arranged in exactly the same manner as the second embodiment to give the same advantage as the second embodiment.

With a real-image type viewfinder optical system arranged in accordance with this invention as described above, in order to cause an object image which is formed on a primary image forming plane by an objective lens to become viewable, by using an image inverting means, as a non-inverted erecting image through an eyepiece lens, the refracting power of the objective lens and the structure of the image inverting means are appositely sat, so that the viewfinder optical system can be compactly arranged while rendering the viewfinder image adequately viewable.

Further, with a reflection surface of a positive power interposed in between an objective lens and a total refection surface, the viewfinder optical system can be simply arranged to be approximately telecentric by using the objective lens and the total reflection surface. In other words, the objective lens does not have to be arranged to be telecentric, so that the objective lens can be compactly arranged.

In each of the first to fourth embodiments described above, a plurality of lenses are disposed within the objective lens system. In the case of embodiments described below, on the other hand, objective lens systems are formed with prism units alone.

Figure 5:
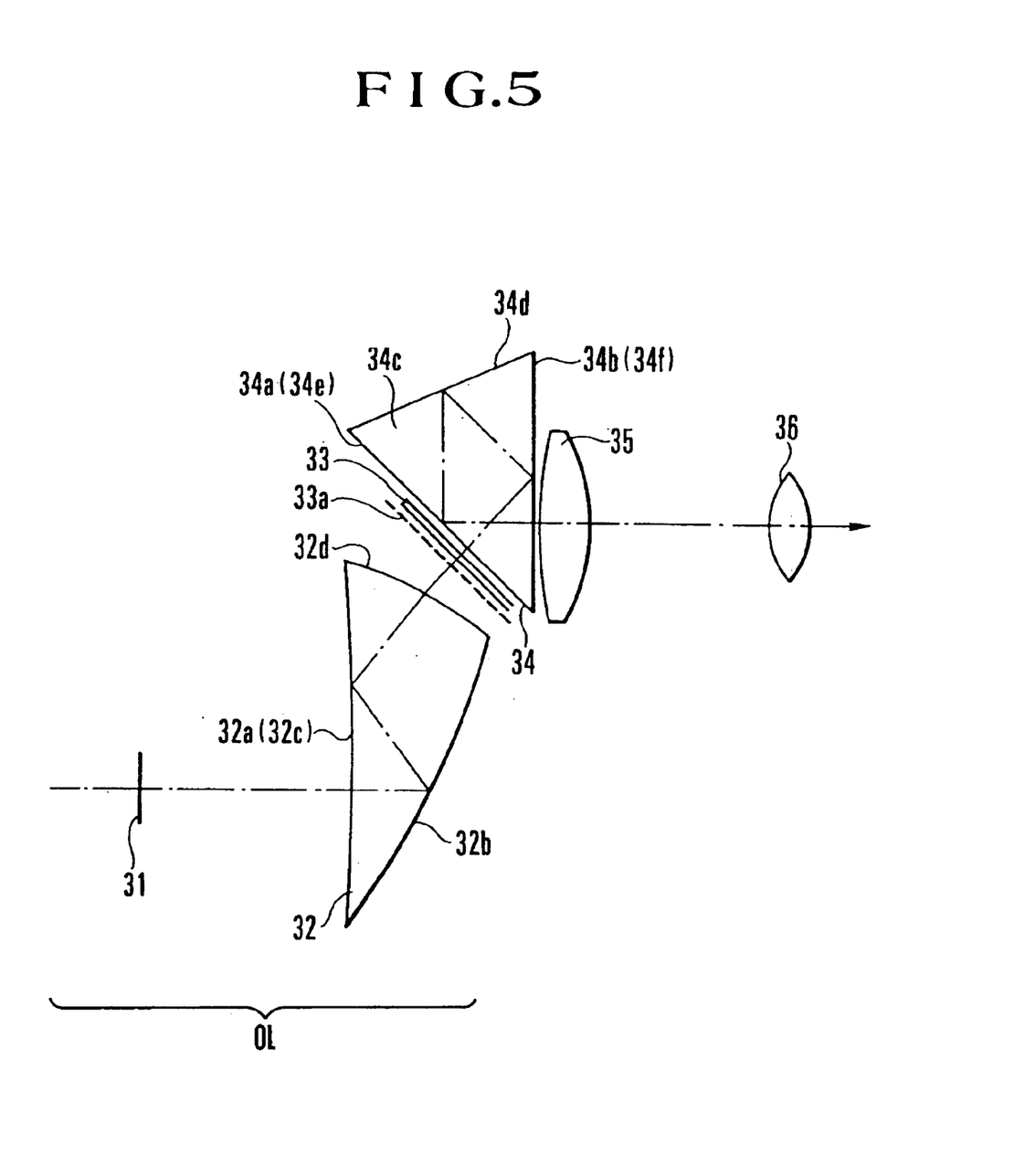
FIG. 5 is a sectional view showing the lenses of a viewfinder optical system arranged according to this invention as a fifth embodiment thereof.
Figure 6:
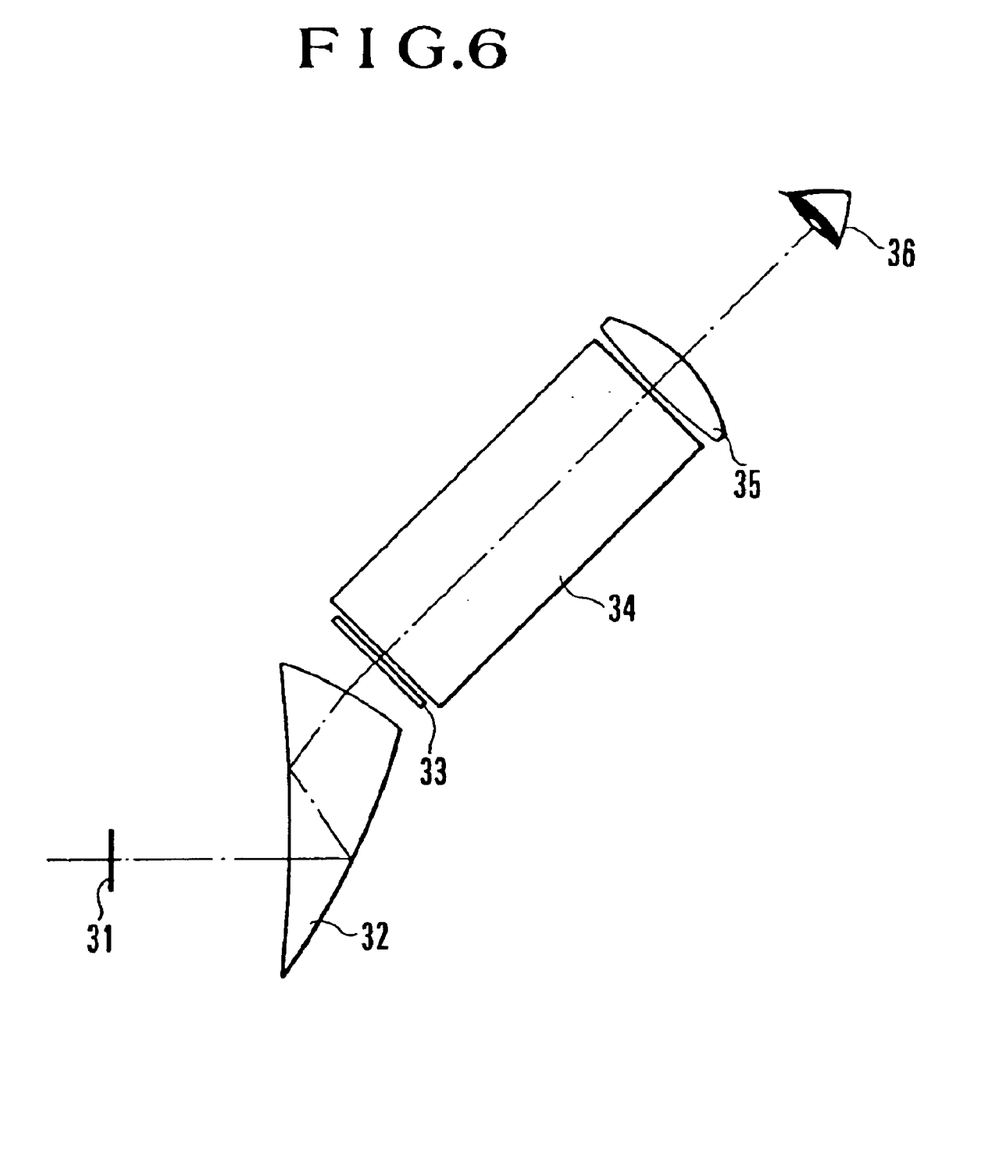
FIG. 6 shows a second prism of the viewfinder optical system shown in FIG. 5 as in a developed state.

FIG. 5 is a sectional view showing essential parts of a viewfinder optical system which is arranged as a fifth embodiment of this invention. FIG. 6 is a sectional view showing essential parts forming an optical path of an image inverting means of FIG. 5 as in a developed form.

Referring to FIGS. 5 and 6, an objective optical system OL includes a stop 31 and a prism 32 which has a positive refractive power as a whole. The objective optical system OL forms an object image on a primary image forming plane 33a. A field frame 33 is disposed in the neighborhood of the primary image forming plane 33a to restrict a viewfinder visual field. Image inverting means 34 is arranged to convert the object image formed on the primary image forming plane 33a into a non-inverted erecting image. An eyepiece lens 35 is arranged to make the object image on the primary image forming plane 33a viewable as the non-inverted erecting image through the image inverting means 34. Reference numeral 36 denotes an eye point for observation.

The structure of the prism 32 which has a positive refractive power and constitutes the objective optical system OL is next described as follows. The prism 32 has an entrance surface 32a which is composed of a planar surface or an aspheric surface having no rotationally symmetric axis and which is arranged to allow a light flux coming from an object through the stop 31 to fall thereon, an eccentric reflection surface 32b which has no rotationally symmetric axis and which is arranged to converge and specularly reflect the light flux coming from the entrance surface 32a toward the entrance surface 32a, a total reflection surface 32c which continues from the entrance surface 32a and which is arranged to totally reflect the light flux coming from the eccentric reflection surface 32b, and an exit surface 32d which is composed of a planar surface or an aspheric surface having no rotationally symmetric axis and which is arranged to allow the light flux from the total reflection surface 32c to exit from there.

In the fifth embodiment, the prism 32, which has a positive refractive power, is arranged to obtain almost the whole refracting power from the eccentric reflection surface 32b. The object image is formed on the primary image forming plane 33a by the refracting power of the eccentric reflection surface 32b. Aberrations of varied kinds including coma, astigmatism, distortion, etc., which are produced by the eccentric reflection surface 32b are adequately corrected by the aspheric surface of the entrance surface 32a (32c) and the aspheric surface of the exit surface 32d in an adequately balanced manner.

The image inverting means 34 is composed of an entrance surface 34a which is arranged to allow a light flux coming from the object image formed on the primary image forming plane 33a to fall thereon, a total reflection surface 34b which is arranged to totally reflect the light flux coming from the entrance surface 34a, roof surfaces 34c and 34d which are arranged to reflect the light flux coming from the total reflection surface 34b, a total reflection surface 34e which is arranged on one and the same plane as the entrance surface 34a to totally reflect the light flux coming from the roof surfaces 34c and 34d, and an exit surface 34f which is arranged on the same plane as the total reflection surface 34b to allow the light flux from the total reflection surface 34e to exit. The object image formed on the primary image forming plane 33a is thus conducted to the eyepiece lens 35 in the state of a non-inverted erecting image. The surfaces 34a to 34f of the image inverting means 34 are all arranged to be a planar surface. However, some of these surfaces may be arranged to be a spherical surface or to be an aspherical surface having no rotationally symmetric axis, as necessary.

Figure 7:
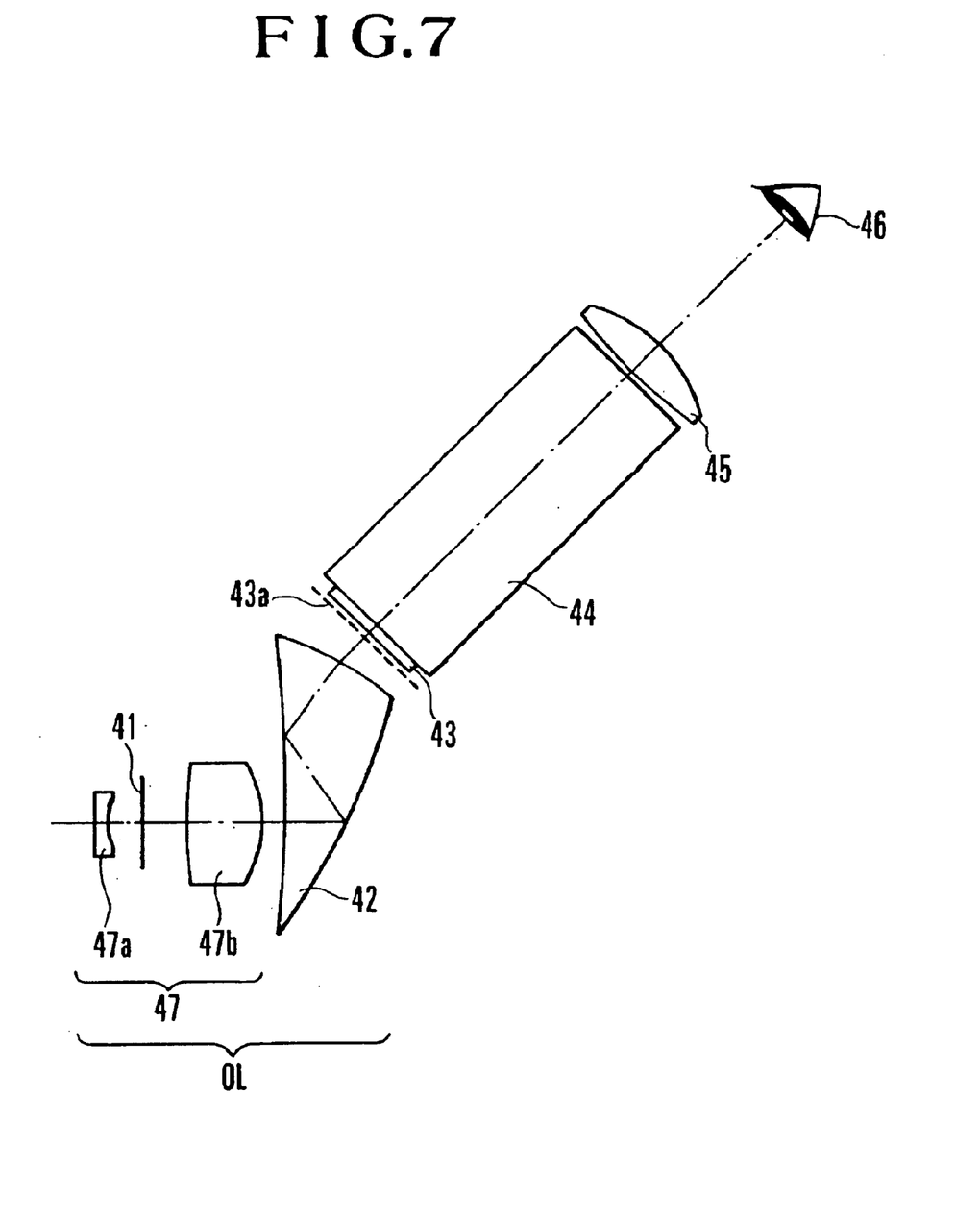
FIG. 7 is a sectional view showing the lenses of a viewfinder optical system arranged according to this invention as a sixth embodiment thereof.

FIG. 7 is a sectional view showing essential parts of a sixth embodiment of this invention.

The sixth embodiment differs from the fifth embodiment in that the objective optical system OL is composed of a lens group 47 of a positive or negative refractive power which includes a negative lens 47a and a positive lens 47b, a stop 41, and a prism 42. With the exception of this point, the structure of the sixth embodiment is the same as the fifth embodiment. With the lens group 47 included in the objective optical system OL, a light flux coming from an object is converged and conducted to the prism 42. This arrangement lessens the burden of the positive refractive power of the prism 42, so that an object image can be adequately formed on a primary image forming plane 43a.

Numerical examples 2 and 3 which respectively relates to the fifth and sixth embodiments are next described as follows. Assuming that an aspheric (free curved) surface which has no rotationally symmetric axis and is disposed within the prism 42 has a Z axis in the direction of the optical axis and X and Y axes in the direction of orthogonally intersecting the optical axis is expressed by the following formula:

$$z = \frac{(x^2+y^2)/R}{1+\sqrt{1-(1+c_1)(x^2+y^2)/R^2}} + c_2 + c_3 y + c_4(x^2 - Y^2) +$$
$$c_5(-1 + 2x^2 + 2y^2) + c_6(-2y + 3x^2 y + 3y^3) + c_7(3x^2 y - y^3) +$$
$$c_8(x^4 - 6x^2 y^2 + 4y^4) + c_9(-3x^2 + 4x^4 + 3y^2 - 4y^4) +$$
$$c_{10}(1 - 6x^2 + 6x^4 - 6y^2 + 12y^2 y^2 + 6y^4) +$$
$$c_{11}(10yx^4 + 20x^2 y^3 + 10y^5 - 12x^2 y - 12y^3 + 3y) +$$
$$c_{12}(15yx^4 10x^2 y^3 - 5y^5 - 12x^2 y + 4y^3) +$$
$$c_{13}(5yx^4 - 10x^2 y^3 + y^5)$$

A rotationally symmetric aspheric surface is expressed by a polynomial formula as follows:

$$z = \frac{y^2/R}{1+\sqrt{1-(1+k)(y/R)^2}} + Ay^2 + By^4 + Cy^6$$

In the numerical examples 2 and 3, Ri represents the shape of the i-th lens surface when counted from the object side, Di represents the i-th lens thickness or air separation when counted from the object side, Ni represents the refractive index of the i-th medium when counted from the object side, and "e−OX" means $10^{-x}$.

NUMERICAL EXAMPLE 2 half angle of view in the direction y=13.0° half angle of view in the direction x=8.8°

| surface | R | D | N | parallel eccentricity (mm) | rotational eccentricity (degree) |
|---|---|---|---|---|---|
| 1 | stop | 11.32 | air | | |
| 2 | free curved surface 32a | 0.75 | 1.49 | −13.85 | 1.15 |
| 3 | free curved surface 32b | 0 | 1.49 | −5.68 | −33.70 |
| 4 | same as surface 2 | | | | |
| 5 | free curved surface 32d | 2.47 | air | 24.20 | 56.55 |
| 6 | plane surface | 0.4 | 1.52 | 0.43 | −12.70 |
| 7 | plane surface | 0.4 | air | | |
| 8 | plane surface | 24.0 | 1.57 | | |
| 9 | plane surface | 0.2 | air | | |
| 10 | rotationally symmetric aspheric surface | 2.35 | 1.49 | | |
| 11 | −13.27 | 15.0 | air | | |
| 12 | pupil | | | | |

In the numerical example 2, the image inverting optical system part (the eighth and ninth surfaces) is shown in a developed state.

Aspheric coefficients of the free curved surface 32a of the numerical example 2 are as follows:

| R | −149.75 |
|---|---|
| C1 | 2.816e+1 |
| C2 | 1.034e−3 |
| C3 | −1.803e−5 |
| C4 | 3.371e−3 |
| C5 | 1.586e−3 |
| C6 | −1.385e−5 |
| C7 | −3.544e−4 |
| C8 | −4.881e−6 |
| C9 | −1.322e−7 |
| C10 | −1.064e−7 |
| C11 | −3.534e−8 |
| C12 | −1.095e−7 |
| C13 | −1.435e−7 |

Aspheric coefficients of the free curved surface 32b of the numerical example 2 are as follows:

| R | −41.527 |
|---|---|
| C1 | 3.388e+0 |
| C2 | −1.563e−5 |
| C3 | −3.703e−5 |
| C4 | −5.017e−3 |
| C5 | −2.460e−5 |
| C6 | −2.835e−5 |
| C7 | −1.071e−4 |
| C8 | −9.078e−6 |
| C9 | −3.001e−7 |
| C10 | −2.047e−6 |
| C11 | 8.588e−8 |
| C12 | 1.506e−8 |
| C13 | 2.061e−7 |

Aspheric coefficients of the free curved surface 32d of the numerical example 2 are as follows:

| R | 0 |
|---|---|
| C1 | 0 |
| C2 | −2.947e−3 |
| C3 | −4.621e−4 |
| C4 | −1.962e−2 |
| C5 | −4.553e−3 |
| C6 | −3.487e−4 |
| C7 | 8.778e−4 |
| C8 | −3.926e−3 |
| C9 | 2.434e−4 |
| C10 | −1.060e−4 |
| C11 | 9.109e−6 |
| C12 | −1.607e−5 |
| C13 | 9.012e−6 |

Coefficients of rotationally symmetric aspheric surfaces of the numerical example 2 are as follows:

| R | 27.633 |
|---|---|
| k | 0 |
| A | 0 |
| B | −0.965e−4 |
| C | −0.911e−7 |

NUMERICAL EXAMPLE 3 half angle of view in the direction y=25.3° half angle of view in the direction x=17.5°

| surface | R | D | N | parallel eccentricity (mm) | rotational eccentricity (degree) |
|---|---|---|---|---|---|
| 1 | −26.79 | 1.0 | 1.58 | | |
| 2 | 7.55 | 1.91 | air | | |
| 3 | stop | 3.10 | air | | |
| 4 | 78.18 | 5.00 | 1.49 | | |
| 5 | −9.40 | 1.32 | air | | |
| 6 | free curved surface 42a | 0.75 | 1.49 | −13.85 | 1.15 |
| 7 | free curved surface 42b | 0 | 1.49 | −5.68 | −33.70 |
| 8 | same as surface | 2 | | | |
| 9 | free curved surface 42d | 2.47 | air | 24.20 | 56.55 |
| 10 | plane surface | 0.4 | 1.52 | 0.43 | −12.70 |
| 11 | plane surface | 0.4 | air | | |
| 12 | plane surface | 24.0 | 1.57 | | |
| 13 | plane surface | 0.2 | air | | |
| 14 | rotationally symmetric aspheric surface | 2.35 | 1.49 | | |
| 15 | −13.27 | 15.0 | air | | |
| 16 | pupil | | | | |

In the numerical example 3, the image inverting optical system part (the twelfth and thirteenth surfaces) is shown in a developed state.

Aspheric coefficients of the free curved surface 42a of the numerical example 3 are as follows:

| R | −149.75 | C7 | −3.544e−4 |
|---|---|---|---|
| C1 | 2.816e+1 | C8 | −4.881e−6 |
| C2 | 1.034e−3 | C9 | −1.322e−7 |
| C3 | −1.803e−5 | C10 | −1.064e−7 |
| C4 | 3.371e−3 | C11 | −3.534e−8 |
| C5 | 1.586e−3 | C12 | −1.095e−7 |
| C6 | −1.385e−5 | C13 | −1.435e−7 |

Aspheric coefficents of the free curved surface 42b of the numerical example 3 are as follows:

| R | −41.527 | C7 | −3.544e−4 |
|---|---|---|---|
| C1 | 3.388e+7 | C8 | −9.078e−6 |
| C2 | −1.563e−5 | C9 | −3.001e−7 |
| C3 | −3.703e−5 | C10 | −2.047e−6 |
| C4 | −5.017e−3 | C11 | 8.588e−8 |
| C5 | −2.460e−5 | C12 | 1.506e−8 |
| C6 | −2.835e−5 | C13 | 2.061e−7 |

Aspheric coefficients of the free curved surface 42d of the numeral example 3 are as follows:

| R | 0 | C7 | 8.778e−4 |
|---|---|---|---|
| C1 | 0 | C8 | −3.926e−3 |
| C2 | −2.947e−3 | C9 | 2.434e−4 |
| C3 | −4.621e−4 | C10 | −1.060e−4 |
| C4 | −1.962e−2 | C11 | 9.109e−6 |
| C5 | −4.553e−3 | C12 | −1.607e−5 |
| C6 | −3.487e−4 | C13 | 9.012e−6 |

Coefficients of rotationally symmetric aspheric surfaces of the numerical example 3 are as follows:

| R | 27.633 |
|---|---|
| k | 0 |
| A | 0 |
| B | −0.965e−4 |
| C | −0.911e−7 |

According to this invention as described above, for causing an object image formed on the primary image forming plane by the objective optical system to become viewable, by using the image inverting means, as a non-inverted erecting image through the eyepiece lens, a real-image type viewfinder optical system can be compactly arranged to be capable of adequately correcting various aberrations by appositely setting the structure of the objective optical system, so that the viewfinder optical system can be compactly arranged and yet the viewfinder image can be adequately observed.

Further, according to this invention, the arrangement of using the prism having an aspherical eccentric specular reflection surface with no rotationally symmetric axis for the objective optical system provides a real-image type viewfinder optical system which not only permits reduction in number of parts but also is capable of rendering the viewfinder image adequately viewable.

What is claimed is:

1. A viewfinder optical system comprising:
    a lens system having at least one lens;
    a first prism on which the light from said lens system is incident, wherein said first prism comprises (a) a curved incident surface on which the light from said lens system is incident and (b) a curved reflection surface with a positive optical power;
    a second prism on which the light from said first prism is incident; and
    an eyepiece lens on which the light from said second prism is incident,
    wherein a primary image is formed between said first prism and said second prism,
    wherein said lens system and said first prism provide an exit telecentric system, with exit telecentricity not being established prior to the reflection by said curved reflection surface,
    wherein said viewfinder optical system satisfies the following condition, $$21° \leq \theta \leq 24°$$

where $\theta$ is the angle of incidence, with respect to said curved reflection surface, of a light ray that entered said first prism along an optical axis of said viewfinder optical system, and
    wherein said curved reflection surface is a rotationally asymmetric surface.

2. A viewfinder optical system according to claim 1, wherein light reflected by said curved reflection surface is subjected to total reflection by said curved incident surface.

3. A viewfinder optical system according to claim 2, wherein said curved incident surface has a negative optical power.

4. A viewfinder optical system according to claim 1, wherein said first prism further comprises a third surface for exiting the light to the outside of said first prism, wherein the light reflected by said curved reflection surface is directed toward said third surface after total reflecting on said curved incident surface.

5. A viewfinder optical system according to claim 4, wherein said curved incident surface has a negative optical power.

6. A viewfinder optical system according to claim 1, wherein said curved reflection surface is a toric surface.

7. A viewfinder optical system according to claim 1, wherein said curved reflection surface is an aspheric toric surface.

8. A viewfinder optical system according to claim 1, wherein said curved incident surface is concave toward said lens system and convex toward said curved reflection surface, and said curved reflection surface is concave toward said curved incident surface.

9. A viewfinder optical system comprising:

at least one lens;

a first prism;

a second prism; and an eyepiece lens, wherein said first prism includes a first surface upon which light from said at least one lens is incident, a second surface which is a curved reflecting surface, and a third surface for exiting the light to the outside of said first prism, wherein the light from said at least one lens, in the following order, passes through said first surface, is reflected by said second surface, is totally reflected by said first surface, and exits through said third surface to the outside of said first prism to said second prism, wherein an image is formed between said first prism and said second prism, and the light exiting said second prism passes to said eyepiece lens, wherein said at least one lens and said first prism provide an exit telecentric system, with exit telecentricity not being established prior to the reflection by said second surface, wherein said viewfinder optical system satisfies the following condition, $$21° \leq \theta \leq 24°$$

where $\theta$ is the angle of incidence, with respect to said second surface, of a light ray that entered said first prism along an optical axis of said viewfinder optical system, wherein said first surface is curved, and wherein said second surface is a rotationally asymmetric surface.

10. A viewfinder optical system according to claim 9, wherein said second surface is a toric surface.

11. A viewfinder optical system according to claim 9, wherein said second surface is an aspheric surface.

12. A viewfinder optical system according to claim 11, wherein said second surface is an aspheric toric surface.

13. A viewfinder optical system according to claim 9, wherein said at least one lens comprises, in order from a direction in which the light enters, a negative lens and a positive lens, both of which move during variation of magnification.

* * * * *

UNITED STATES PATENT AND TRADEMARK OFFICE
CERTIFICATE OF CORRECTION

PATENT NO. : 6,867,916 B2
DATED : March 15, 2005
INVENTOR(S) : Takeshi Koyama et al.

It is certified that error appears in the above-identified patent and that said Letters Patent is hereby corrected as shown below:

<u>Title page,</u>
Insert Item -- [*] Notice  This patent issued on a continued prosecution application filed under 37 CFR 1.53(d), and is subject to the twenty year patent term provisions of 35 U.S.C. 154 (a)(2). --.

<u>Column 3,</u>
Line 50, "the a" should read -- the --.

<u>Column 4,</u>
Line 59, "vi" should read -- υi --.

<u>Column 8,</u>
Line 64, "relates" should read -- relate --.

<u>Column 9,</u>
Line 14, "$15yx^4 10x^2y^3$" should read -- $15yx^4 + 10x^2y^3$ --.
Line 32, "e-OX" should read -- e-0X --.

<u>Column 11,</u>
Line 11, "surface   2" should read -- surface 2 --.
Line 50, "-3.544e-4" should read -- -1.071e-4 --.
Line 51, "3.388e+7" should read -- 3.388e+0 --.

Signed and Sealed this

Ninth Day of August, 2005

JON W. DUDAS
*Director of the United States Patent and Trademark Office*